(12) United States Patent
Segall et al.

(10) Patent No.: US 6,717,057 B1
(45) Date of Patent: Apr. 6, 2004

(54) CONDUCTIVE COMPOSITE FORMED OF A THERMOSET MATERIAL

(75) Inventors: Daniel P. Segall, Longmeadow, MA (US); Iris E. Hilton, Charlton, MA (US); Sharon A. Fales-Bond, Brookfield, MA (US); John R. Pennace, Paxton, MA (US)

(73) Assignee: FLEXcon Company, Inc., Spencer, MA (US)

( * ) Notice: Subject to any disclaimer, the term of this patent is extended or adjusted under 35 U.S.C. 154(b) by 0 days.

(21) Appl. No.: 10/017,490

(22) Filed: Dec. 14, 2001

Related U.S. Application Data

(60) Provisional application No. 60/311,187, filed on Aug. 9, 2001.

(51) Int. Cl.⁷ .................................................. H01B 7/08
(52) U.S. Cl. .......................... 174/117 FF; 174/117 A
(58) Field of Search .................. 174/117 F, 117 FF, 174/36, 117 A, 250

(56) References Cited

U.S. PATENT DOCUMENTS

| | | | | |
|---|---|---|---|---|
| 4,098,628 A | * | 7/1978 | Walton | 156/52 |
| 4,125,739 A | * | 11/1978 | Bow | 174/36 |
| 4,501,929 A | * | 2/1985 | Escallier et al. | 174/117 F |
| 5,144,098 A | * | 9/1992 | VanDeusen | 174/36 |
| 5,330,811 A | * | 7/1994 | Buchalter | 428/40.9 |
| 5,665,469 A | | 9/1997 | Brandt et al. | 428/349 |
| 6,225,556 B1 | * | 5/2001 | Saito | 174/36 |
| 2002/0104676 A1 | * | 8/2002 | Treutlein et al. | 174/117 F |

FOREIGN PATENT DOCUMENTS

| | | | |
|---|---|---|---|
| DE | 3015387 A | | 4/1982 |
| JP | 6-176629 | * | 6/1994 |
| WO | WO 9620827 A | | 7/1996 |
| WO | WO 9737054 A | | 10/1997 |

* cited by examiner

*Primary Examiner*—Chau N. Nguyen
(74) *Attorney, Agent, or Firm*—Gauthier & Connors; Maurice E. Gauthier

(57) ABSTRACT

An electrically conductive multilayer composite comprises first and second polymeric films, each being flexible and having upper and lower surfaces, with the second film being thermoformable at temperatures at and above its glass transition temperature. A flexible electrically conductive layer is applied to the upper surface of the first film, and an adhesive interlayer adheres the lower surface of the first film to the upper surface of the second film. The adhesive interlayer has elastic properties sufficient to accommodate relative movement between the thus adhered films occasioned by flexure of the composite.

12 Claims, 2 Drawing Sheets

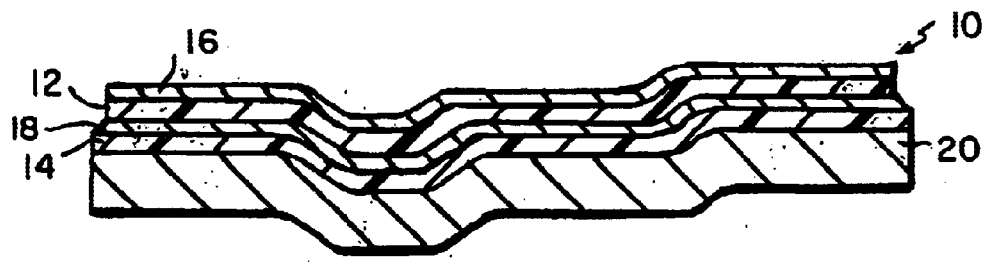
FIG. 5
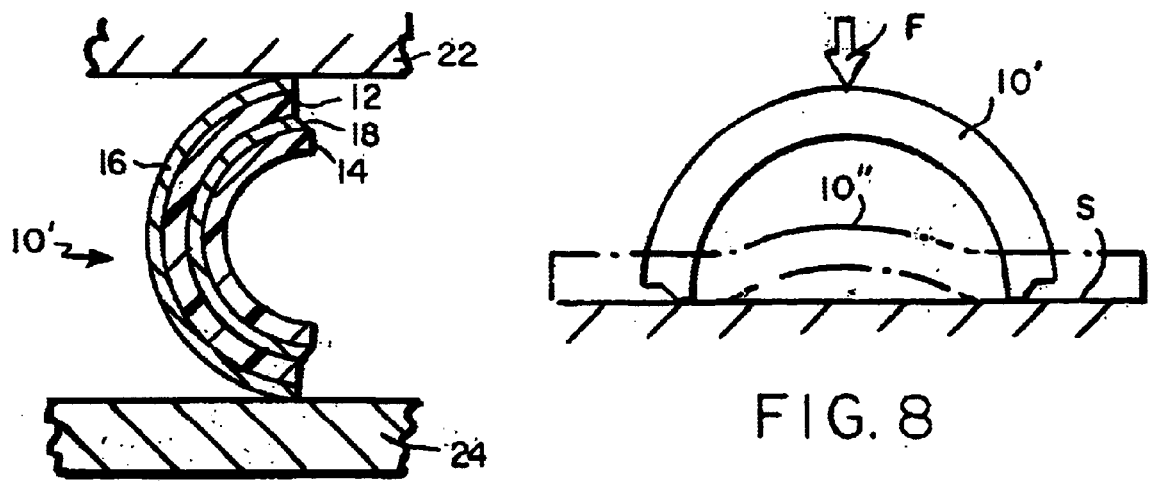
FIG. 6
FIG. 8
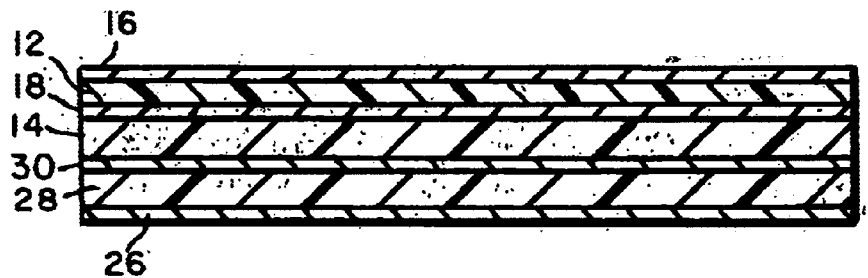
FIG. 7

CONDUCTIVE COMPOSITE FORMED OF A THERMOSET MATERIAL

CROSS REFERENCE TO RELATED APPLICATION

This application claims priority from Provisional Patent Application Ser. No. 60/311,187 filed Aug. 9, 2001.

BACKGROUND OF THE INVENTION

1. Field of the Invention

This invention relates to electrically conductive materials useful in the formation of EMI/RFI shielding gaskets and the like.

2. Description of the Prior Art

It is known to form EMI/RFI shielding gaskets from metal alloys such as metal phosphate and beryllium copper, the latter being the most widely used. Such alloys are relatively expensive. Moreover, in a Hazard Information Bulletin published by the Occupational Safety and Health Administration on Sep. 2, 1999, exposure to beryllium has been cited as a cause of chronic beryllium disease (CBD), a disabling and often fatal lung disease. It appears likely, therefore, that the use of alloys containing beryllium may eventually be severely curtailed, if not banned.

It is also known to form EMI/RFI gaskets from composites comprising metallic foils bonded to polymeric substrates. While such composites are less expensive than the above mentioned metal alloys, experience has indicated that either during formation into gaskets, or subsequently during repeated flexure of the gaskets, the metallic foils tend to crease, crack or pull away from the polymeric substrates.

The objective of the present invention is to provide an improved electrically conductive composite material that overcomes the shortfalls of the previously developed composites, and is both relatively inexpensive as compared to metal alloys, and readily formable into gaskets and other like EMI/RFI shielding components.

SUMMARY OF THE INVENTION

In accordance with the present invention, first and second polymeric films are provided, each being flexible and having upper and lower surfaces, with the second film being thermoformable at temperatures at and above its glass transition temperature. A flexible electrically conductive layer is applied to the upper surface of the first film, and the lower surface of the first film is adhered to the upper surface of the second film by an adhesive interlayer. The adhesive interlayer has elastic properties sufficient to accommodate relative movement between the thus adhered films occasioned by flexure of the composite. The relative movement between the first and second films during flexure of the composite serves to safeguard the electrically conductive layer from creasing, cracking or pulling away form the upper surface of the first film.

In addition to being thermoformable, the second film also may be resilient. Additional films may be included in the composite, and a second flexible electrically conductive layer may be applied to the side of the composite opposite to that to which the first conductive layer is applied.

These and other features and objective so the present invention will now be described in greater detail with reference to the accompanying drawings, wherein:

BRIEF DESCRIPTION OF THE DRAWINGS

FIG. 5 is a view showing the composite contoured to the shape of a substrate;

FIG. 6 is a view showing the composite resiliently bridging the gap between two mutually spaced relatively movable components;

FIG. 7 is a view of an alternative embodiment having electrically conductive layers applied to both sides; and FIG. 8 is an illustration of the test procedure used to evaluate the performance of composites in accordance with the present invention.

DETAILED DESCRIPTION OF PREFERRED EMBODIMENTS

Figure 1:
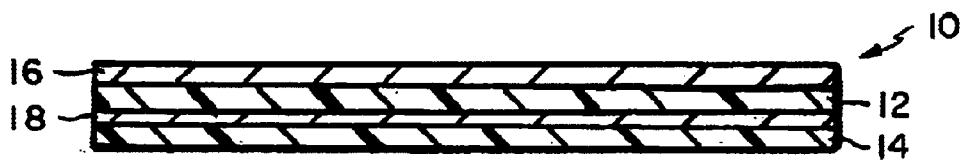
FIG. 1 is a sectional view taken through one embodiment of an electrically conductive multilayer composite in accordance with the present invention, it being understood that this view is greatly enlarged with the relative dimensions of components exaggerated for illustrative purposes.
Figure 2:
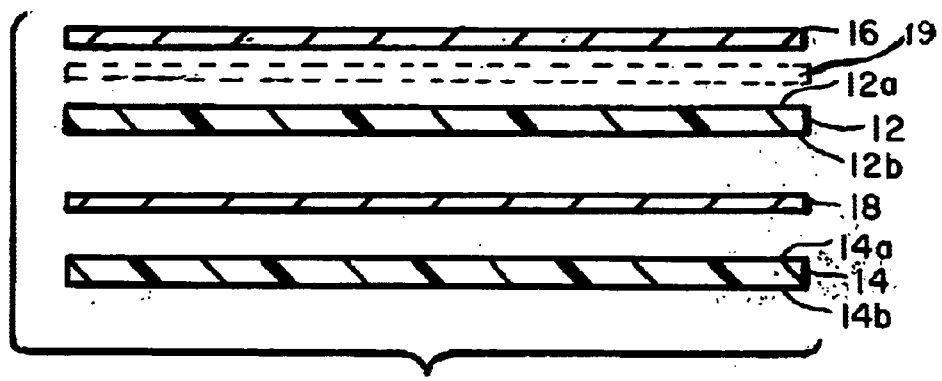
FIG. 2 is an exploded view of the composite shown in FIG. 1, with the addition of an optional second adhesive for securing the conductive layer to the upper surface of the first film.

With reference initially to FIGS. 1 and 2, an electrically conductive multilayer composite in accordance with one embodiment of the present invention is shown at 10. The composite includes first and second flexible polymeric films 12, 14. Film 12 has upper and lower surfaces 12a, 12b, and film 14 also has upper and lower surfaces 14a, 14b. Film 14 is thermoformable at temperatures at and above its glass transition temperature.

A flexible electrically conductive layer 16 is applied to the upper surface 12a of film 12, and an adhesive interlayer 18 adheres the lower surface 12b of film 12 to the upper surface 14a of film 14. FIG. 2 additionally shows an optional second adhesive for securing the conductive layer 16 to the upper surface 12a of film 12.

The electrically conductive layer 16 is selected from the group consisting of copper, aluminum, nickel, tin, silver, gold, ferrous metals and alloys thereof. The electrically conductive layer may be applied as a foil adhered to the upper surface 12a of film 12 by an adhesive (not shown), or it may comprise a coating applied by known techniques, including for example electroplating, non-electrode deposition, vacuum deposition, plasma deposition, sputter deposition, etc. In all cases, the layer 16 advantageously will be relatively thin, preferably not more than 20 mils in thickness, and it will be securely anchored to the upper film surface 12a. The film 12 supports and stabilizes the electrically conductive layer 16, and in so doing resists creasing, cracking, or separation of the electrically conductive layer from the film surface 12a.

The polymeric materials of the films 12, 14 may be selected from the group consisting of polyesters, polyamides, polyimides, polyurethanes, polyethylenenesulfones, polybutenes, and derivatives, polycarbonates, polystyrene, (and copolymers containing styrene) polyethylene (linear), polyethyethyleneketones, polyacrylates (including methacrylates), rigid PVC (and copolymers). Preferably, the bulk modules of elasticity of film 14 is higher than that of film 12.

The adhesive of interlayer 18 is preferably pressure sensitive, examples being those identified by the product designations V402, V-23, V-106, V-95, V-98, V-156 and Densil, all of which are available from FLEXcon, Inc. of Spencer, Mass., U.S.A. Such adhesives exhibit elastic properties at temperatures ranging from −50 to 150° C.

The composite 10 may be heated to an elevated temperature at or above the glass transition temperature of film 14, then flexed and formed into a shaped configuration as shown for example at 10' in FIG. 3, and then cooled below the glass transition temperature of film 14 to retain the thus shaped configuration. Flexure of the composite as a result of shaping will occasion relative displacement of the films 12, 14, as reflected by the edge offset "x" illustrated in FIG. 4. The elastic properties of the adhesive interlayer 18 are sufficient to accommodate such relative movement between the films, during initial shaping as well as subsequently, when the thus shaped composite is subjected to repeated flexure, with the result that minimal stress is placed on the electrically conductive layer 16 anchored to the upper surface 12a of film 12.

The composite 10 may be thermoformed into various shapes. For example, and as shown in FIG. 5, the composite may be contoured to the shape of a substrate such as the outer housing 20 of a cell phone, thus serving to shield the user from RFI generated by the phone.

As shown in FIG. 6, in cases where the second film 14 is comprised of a polymer that is both thermoformable and resilient, for example polyester, the composite 10' may be utilized as an EMI/RFI shielding gasket bridging the gap between components 22, 24 that are movable toward and away from each other. The gasket will respond to relative movement of the components 22, 24 by flexing resiliently, with the elastic properties of the adhesive interlayer 18 again accommodating relative movement between the first and second films 12, 14.

In a further embodiment as shown in FIG. 7, a second conductive layer 26 may be applied to a third film 28, and the third film may be adhered to the bottom surface 14b of the second film 14 by a second adhesive interlayer 30 having elastic properties sufficient to accommodate relative movement between the second and third films occasioned by flexure of the composite when employed, for example, in a switch or the like.

EXAMPLE 1

An electrically conductive multilayer composite was formed by initially employing a thermoset adhesive (Devcon 5 minute Epoxy supplied by the Consumer Division of ITW Performance Polymers of Riviera Beach, Fla.) to adhere a 0.7 mil copper foil to the upper surface of a 1.0 mil polyester "first" film. The lower surface of the first film was then adhered to the upper surface of a 4.0 mil polyester "second" film by means of a pressure sensitive adhesive (FLEXcon's V402).

Figure 3:
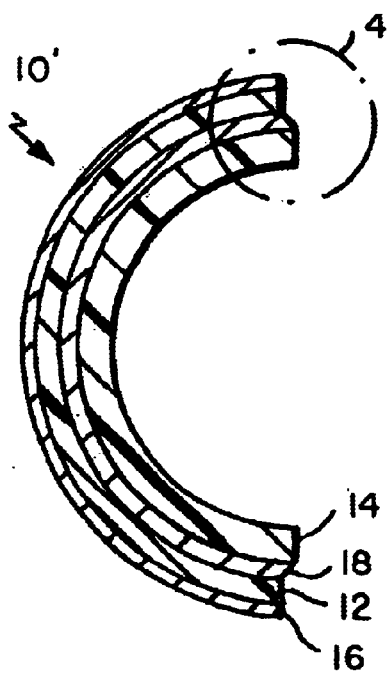
FIG. 3 is a view showing the composite after it has been thermoformed into a shaped non-planar configuration.
Figure 4:
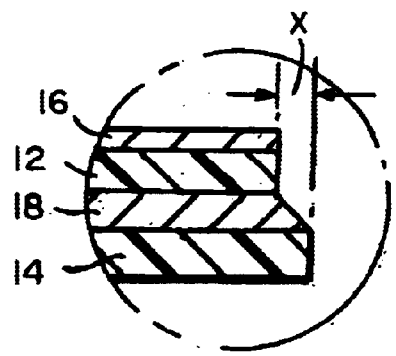
FIG. 4 is an enlarged view of the circled portion of FIG. 5.

The composite was then thermoformed into a semicircular cross-sectional profile 10' as shown in FIGS. 3 and 6, having an inner diameter of 0.75 inches. This was accomplished by bending the composite around a cylindrical support heated to a temperature of 250° F. and maintaining the composite in this position for 60 seconds, followed by cooling to ambient temperatures.

As depicted in FIG. 8, the thus formed composite 10' was then supported on a flat surface S and repeatedly flexed to a nearly flat condition as shown by the broken lines at 10". Flexure was achieved in cycles by applying and releasing a downward force F at one second intervals. After 100 cycles, the copper foil remained smooth and securely adhere to the underlying film, with no signs of creasing or cracking.

EXAMPLE 2

Aluminum was vacuum deposited to a thickness of 1.5–2.0 microns on the upper surface of a 1.0 mil polyester first film, and the lower surface of the first film was adhered to the upper surface of a 4.0 mill polyester second film by means of a pressure sensitive adhesive (FLEXcon's V402). The resulting composite was then thermoformed and tested in accordance with the procedures described in Example 1. After 100 test cycles, the aluminum remained smooth and securely adhered to the underlying film, with no signs of splitting or cracking.

COMPARATIVE EXAMPLE 1

A thermoset adhesive was used to adhere a 0.7 mil copper foil to the upper surface of a 4.0 mil polyester film. The thermoset adhesive, copper foil and film were the same as those employed in Example 1. The resulting composite was then thermoformed and tested through repeated cycles, also in accordance with the procedures described in Example 1. After only five test cycles, the copper foil exhibited serious cracking.

COMPARATIVE EXAMPLE 2

A pressure sensitive adhesive (V-402) was used in place of a thermoset adhesive to form the composite of Comparative Example 1. The resulting composite was thermoformed and tested through repeated cycles, in accordance with the procedures described in Example 1. After two test cycles, the copper foil exhibited creases and "piping" (pulling away from the underlying film), and at about 20 test cycles, continued creasing caused the foil to begin splitting.

COMPARATIVE EXAMPLE 3

Aluminum was vacuum deposited to a thickness of 1.5–2.0 microns on the silicone coated surface of a polyester carrier film. The aluminum deposit was then transferred from the carrier film and adhered to the surface of a 4.0 mil polyester film by means of a pressure sensitive adhesive (FLEXcon's V402). The composite was thermoformed and tested in accordance with the procedures described in Example 1. Metal splitting was observed within ten test cycles.

In light of the foregoing, it will be seen that the interposition of a film 12 and adhesive interlayer 18 between the metallic layer 16 and support film 14, combined with the elastic properties of the adhesive interlayer, serves to beneficially stabilize and protect the metallic layer from damage caused by repeated flexure of the composite.

We claim:

1. An electrically conductive multilayer composite comprising:
   first and second polymeric films, each of said films being flexible and having upper and lower surfaces, said second film being thermoformable at temperatures at and above its glass transition temperature;
   a flexible electrically conductive layer applied to the upper surface of said first film; and
   an adhesive interlayer adhering the lower surface of said first film to the upper surface of said second film, said adhesive interlayer having elastic properties sufficient to accommodate relative movement between the thus adhered films occasioned by flexure of said composite.

2. The composite of claim 1 wherein said second film is resilient.

3. The composite of claim 2 wherein said adhesive interlayer has elastic properties at temperatures between about −50 to 150° C.

4. The composite of claim 2 wherein said second film has a higher bulk modulus of elasticity than that of said first film.

5. The composite of claim 2 further comprising a second flexible electrically conductive layer applied to the side of said composite opposite to that to which said first mentioned electrically conductive layer is applied.

6. The composite of claims 1 or 2 wherein said electrically conductive layer comprises a metallic foil adhered to the upper surface of said first film by means of a second adhesive.

7. The composite of claims 1 or 2 wherein said adhesive interlayer is pressure sensitive.

8. The composite of claims 1 or 2 further comprising a third flexible polymeric film adhered to the lower surface of said second film by a second adhesive interlayer.

9. The composite of claims 1 or 2 wherein said electrically conductive layer is selected from the group consisting of copper, aluminum, nickel, tin, silver, gold, ferrous metals and alloys thereof.

10. The composite of claims 1 or 2 wherein said electrically conductive layer has a thickness of not more than about 20 mil.

11. The composite of claims 1 or 2 wherein the polymeric materials of said first and second films are selected from the group consisting of polyesters, polyamides, polyimides, polyurethanes, polyethylenenesulfones, polybutenes, and derivatives, polycarbonates, polystyrene, and copolymers thereof containing styrene, polyethylene and linear polyethylene, polyethyethylenetones, polyacrylates including methacrylates, rigid PVC and copolymers thereof.

12. The composite of claims 1 or 2 wherein said electrically conductive layer is interfacially fixed with respect to the upper surface of said first film.

* * * * *